(12) United States Patent
Pahl

(10) Patent No.: US 11,671,526 B2
(45) Date of Patent: Jun. 6, 2023

(54) DOUBLE SMART PHONE CASE ASSEMBLY

(71) Applicant: Lucas Pahl, Greenfield, MN (US)

(72) Inventor: Lucas Pahl, Greenfield, MN (US)

( * ) Notice: Subject to any disclaimer, the term of this patent is extended or adjusted under 35 U.S.C. 154(b) by 85 days.

(21) Appl. No.: 17/240,044

(22) Filed: Apr. 26, 2021

(65) Prior Publication Data
US 2022/0345554 A1 Oct. 27, 2022

(51) Int. Cl.
*H04M 1/02* (2006.01)
*H04B 1/3888* (2015.01)

(52) U.S. Cl.
CPC ........ *H04M 1/0264* (2013.01); *H04B 1/3888* (2013.01)

(58) Field of Classification Search
CPC ............................ H04M 1/0264; H04B 1/3888
See application file for complete search history.

(56) References Cited

U.S. PATENT DOCUMENTS

| 10,764,417 | B1 * | 9/2020 | Malach | ................. | H04B 1/3888 |
| 2022/0061483 | A1 * | 3/2022 | Milner | ................... | A45C 11/00 |

* cited by examiner

*Primary Examiner* — Yuwen Pan
*Assistant Examiner* — Fatuma G Sherif

(57) ABSTRACT

A double smart phone case assembly includes a first case that has a first camera opening extending through the first case. A first smart phone can be positioned in the first case such that a camera on the first smart phone is aligned with the first camera opening. A second case is provided and the second case has a second camera opening extending through the second case. A second smart phone is positionable in the second case such that a camera on the second smart phone is aligned with the second camera opening. Moreover, the second case is positioned on the first case such that the first camera opening is offset from the second case and the second camera opening is offset from the first case.

4 Claims, 4 Drawing Sheets

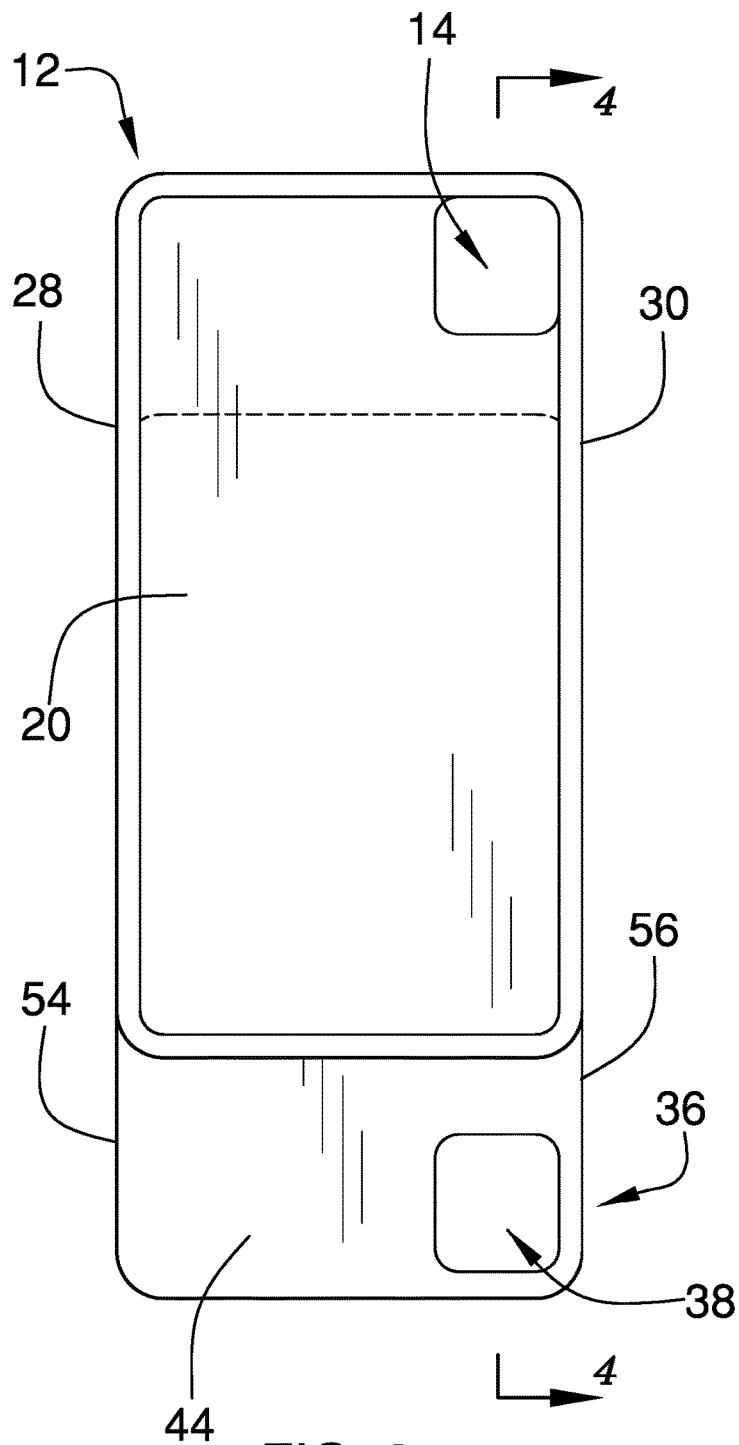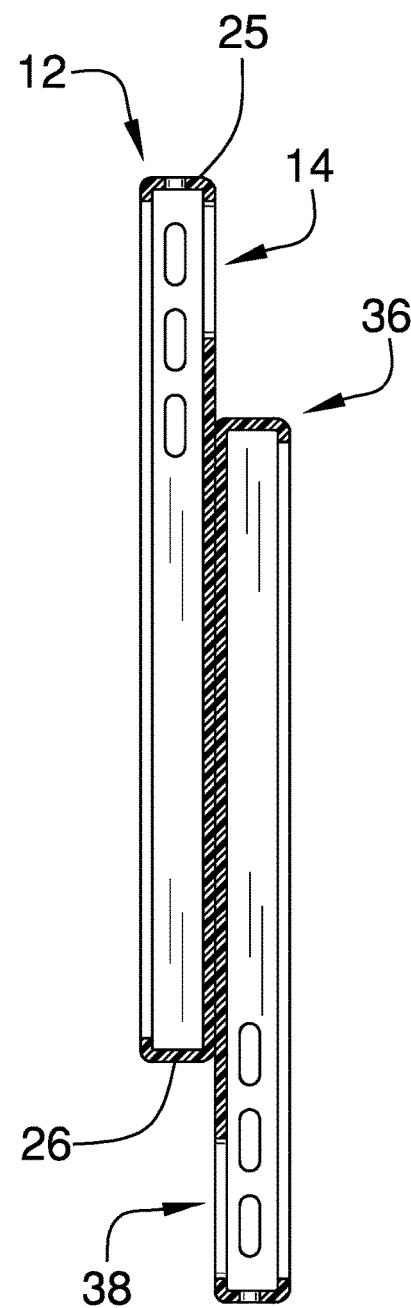
FIG. 3
FIG. 4

DOUBLE SMART PHONE CASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone case devices and more particularly pertains to a new phone case device for storing a pair of smart phones such that a camera on each of the smart phones can function normally. The device includes a first case that is attached to a second case, each of which can contain a respective first smart phone and a second smart phone. Each of the first case and the second case has a camera opening that is exposed to facilitate a camera on each of the first smart phone and the second smart phone to be employed in the normal manner.

(2) Description of Related Art Including Information Disclosed Under 37 CFR 1.97 and 1.98

The prior art relates to phone case devices including a variety of modular smart phone cases that can be customized to accommodate a variety of smart phones. In no instance does the prior art disclose a double smart phone case for containing a pair of smart phones, each of which has a dedicated camera opening.

BRIEF SUMMARY OF THE INVENTION

An embodiment of the disclosure meets the needs presented above by generally comprising a first case that has a first camera opening extending through the first case. A first smart phone can be positioned in the first case such that a camera on the first smart phone is aligned with the first camera opening. A second case is provided and the second case has a second camera opening extending through the second case. A second smart phone is positionable in the second case such that a camera on the second smart phone is aligned with the second camera opening. Moreover, the second case is positioned on the first case such that the first camera opening is offset from the second case and the second camera opening is offset from the first case.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a cross sectional view taken along line 4-4 of FIG. 3 of an embodiment of the disclosure.

DETAILED DESCRIPTION OF THE INVENTION

Figure 1:
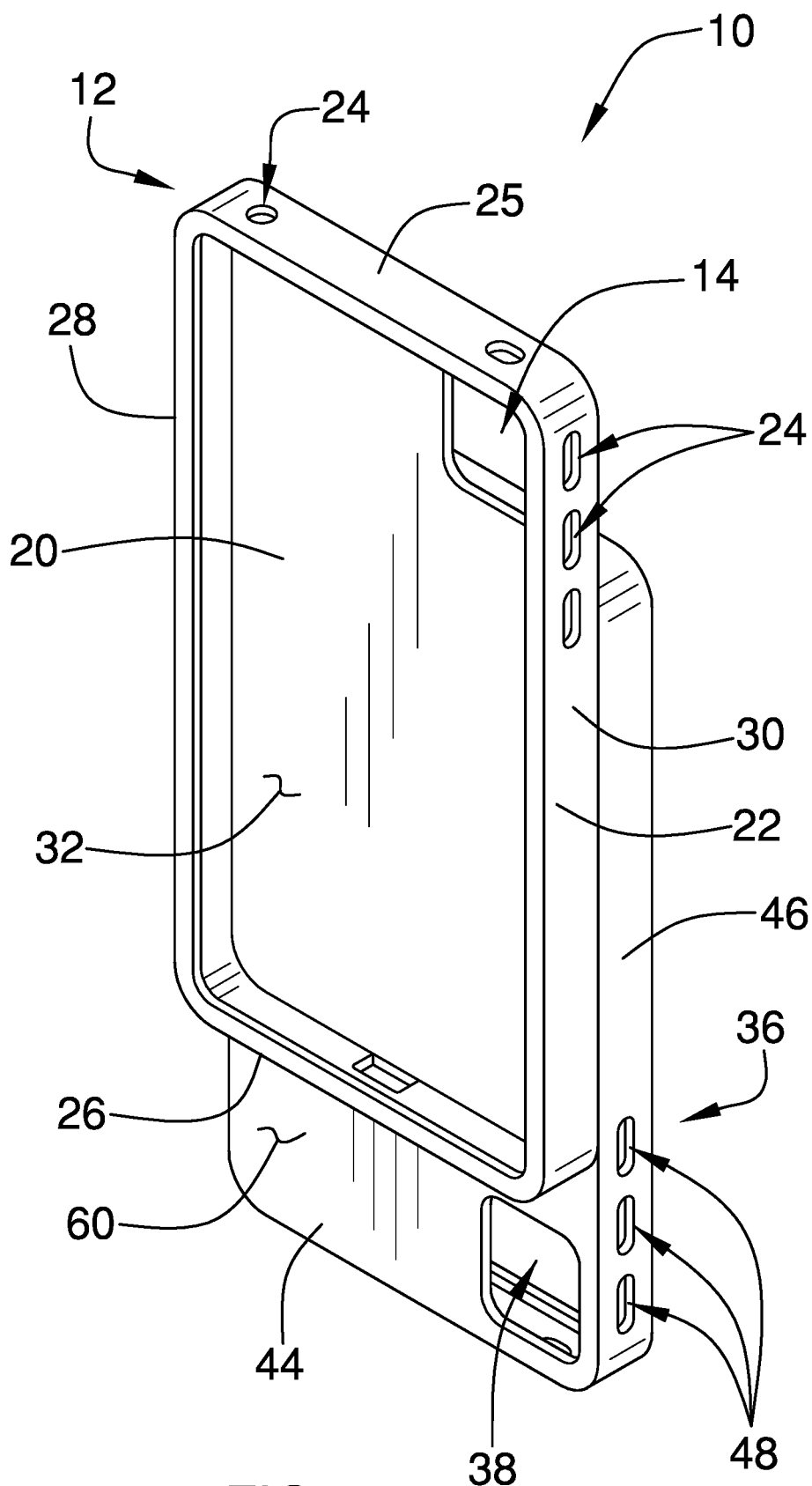
FIG. 1 is a front perspective view of a double smart phone case assembly according to an embodiment of the disclosure.
Figure 2:
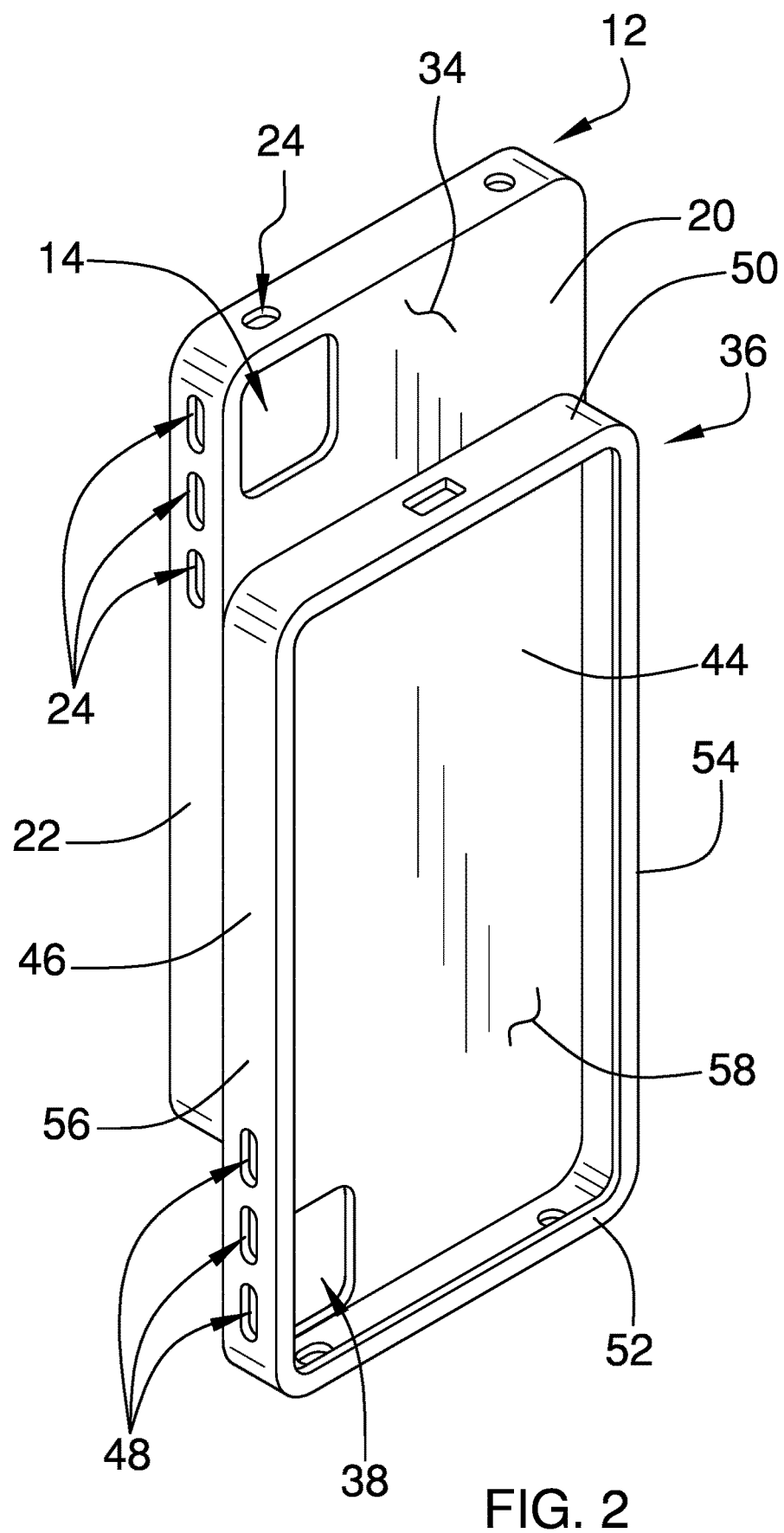
FIG. 2 is a back perspective view of an embodiment of the disclosure.
Figure 5:
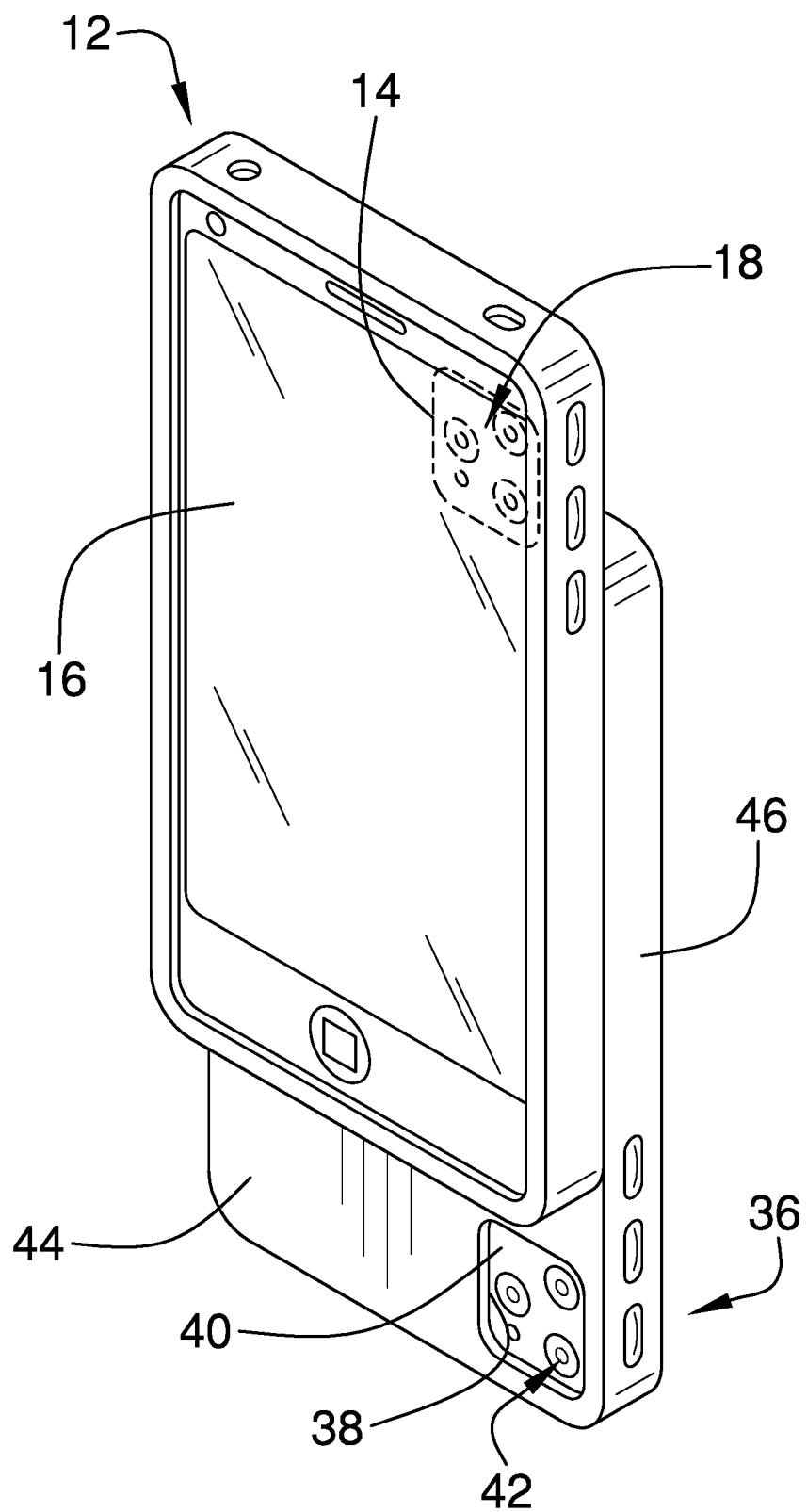
FIG. 5 is a perspective in-use view of an embodiment of the disclosure.

With reference now to the drawings, and in particular to FIGS. 1 through 5 thereof, a new phone case device embodying the principles and concepts of an embodiment of the disclosure and generally designated by the reference numeral 10 will be described.

As best illustrated in FIGS. 1 through 5, the double smart phone case assembly 10 generally comprises a first case 12 that has a first camera opening 14 extending through the first case 12. A first smart phone 16 can be positioned in the first case 12 such that a camera 18 on the first smart phone 16 is aligned with the first camera opening 14. The first case 12 has a rear wall 20 and a perimeter wall 22 extending away from the rear wall 20, and the perimeter wall 22 has a plurality of first access openings 24 each extending through the perimeter wall 22. In this way each of the first access openings 24 facilitates respective elements on the first smart phone 16 to be accessible when the first smart phone 16 is in the first case 12.

The first case 12 may be a smart phone case that is structured to accommodate a variety of different makes and models of smart phones. Additionally, the first access openings 24 might include control button openings, charger openings and other openings that are common the existing smart phone cases. The perimeter wall 22 has a top side 25, a bottom side 26, a first lateral side 28 and a second lateral side 30. The first camera opening 14 is positioned adjacent to the top side 25. The rear wall 20 has a first surface 32 and a second surface 34, and the perimeter wall 22 extends away from the first surface 32. The first camera opening 14 extends through the first surface 32 and the second surface 34.

A second case 36 is provided and a second camera opening 38 extends through the second case 36. A second smart phone 40 can be positioned in the second case 36 such that a camera 42 on the second smart phone 40 is aligned with the second camera opening 38. The second case 36 is positioned on the first case 12 such that the first camera opening 14 is offset from the second case 36 and the second camera opening 38 is offset from the first case 12. In this way the camera 18, 42 on each of the first smart phone 16 and the second smart phone 40 can function normally. The second case 36 may be a smart phone case that is structured to accommodate a variety of makes and models of smart phones. Additionally, each of the first smart phone 16 and the second smart phone 40 may be smart phones of any existing make and model.

The second case 36 has a back wall 44 and a perimeter wall 46 extending away from the back wall 44. The perimeter wall 46 of the second case 36 has a plurality of second access openings 48 each extending through the perimeter wall 46 of the second case 36. In this way respective elements on the second smart phone 40 can be accessible when the second smart phone 40 is positioned in the second case 36. The perimeter wall 46 of the second case 36 has a top side 50, a bottom side 52, a first lateral side 54 and a second lateral side 56. The back wall 44 has a primary surface 58 and a secondary surface 60, and the perimeter wall 46 of the second case 36 extends away from the primary surface 58. Additionally, the second camera opening 38 extends through the primary surface 58 and the secondary surface 60. The second access openings 24 might include control button openings, charger openings and other openings that are common the existing smart phone cases.

The secondary surface 60 of the back wall 44 is bonded to the second surface 34 of the rear wall 20 of the first case 12. Each of the first lateral side 28 and the second lateral side 30 associated with the first case 12 is aligned with a respective one of the first lateral side 54 and the second lateral side 56 associated with the second case 36. The second camera opening 38 is positioned adjacent to the bottom side 52 of the perimeter wall 46 of the second case 36. The top side 50 of the perimeter wall 46 of the second case 36 is spaced downwardly from the top side 25 of the perimeter wall 22 of the first case 12. Additionally, the bottom side 52 of the perimeter wall 46 of the second case 36 is spaced downwardly from the bottom side 26 of the perimeter wall 22 of the first case 12.

In use, the first smart phone 16 is positioned in the first case 12 and the second smart phone 40 is positioned in the second case 36. In this way, a user that is required to carry a work phone and a personal phone, for example, can carry the first smart phone 16 and the second smart phone 40 together. Thus, the user can employ either the first smart phone 16 or the second smart phone 40 at any time. Additionally, the placement of the first camera opening 14 and the second camera opening 38 facilitates the camera 18, 42 on either the first smart phone 16 or the second smart phone 40 to be used in the normal manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A double smart phone case assembly for containing two first smart phones in an offset manner to facilitate the camera on both first smart phones to be functional, said assembly comprising:
   a first case having a first camera opening extending through said first case wherein said first case is configured to contain a first smart phone having a camera on the first smart phone being aligned with said first camera opening;
   a second case having a second camera opening extending through said second case wherein said second case is configured to contain a second smart phone having a camera on the second smart phone being aligned with said second camera opening;
   wherein said first case has a rear wall and a perimeter wall extending away from said rear wall, said rear wall having a first surface and a second surface, said perimeter wall extending away from said first surface, said first camera opening extending through said first surface and said second surface; and
   wherein said second case has a back wall and a perimeter wall extending away from said back wall, said back wall having a primary surface and a secondary surface, said perimeter wall of said second case extending away from said primary surface, said second camera opening extending through. said primary surface and said secondary surface; and
   said secondary surface being bonded to said second surface of said back wall of said first case such that said first case and said second case are in a fixed offset position relative to each other wherein said first camera opening is exposed offset from said second case and said second camera opening is exposed offset from said first case.

2. The assembly according to claim 1, wherein:
   said perimeter wall of said first case has a top side, a bottom side, a first lateral side and a second lateral side, said first camera opening being positioned adjacent to said top side; and
   said perimeter wall of said second case has a top side, a bottom side, a first lateral side and a second lateral side, said second camera opening being positioned adjacent to said bottom side of said perimeter wall of said second case.

3. The assembly according to claim 1, wherein:
   said first case has a rear wall and a perimeter wall extending away' from said rear wall, said rear wall having a first surface and a second surface, said perimeter wall extending away' from said first surface, said first camera opening extending through said first surface and said second surface; and said second case has a back wall and a perimeter wall extending away from said back wall, said back wall having a primary surface and a secondary surface, said perimeter wall of said second case extending away from said primary surface, said second camera opening extending through said primary surface and said secondary surface, said secondary surface being bonded to said second surface of said back wall of said first case;

said perimeter wall of said first case has a top side, a bottom side, a first lateral side and a second lateral side, said first camera opening being positioned adjacent to said top side;

said perimeter wall of said second case has a top side, a bottom side, a first lateral side and a second lateral side, said second camera opening being positioned adjacent to said bottom side of said perimeter wall of said second case; and each of said first lateral side and said second lateral side being associated with said first case is aligned with a respective one of said first lateral side and said second lateral side associated being with said second case.

4. A double smart phone case assembly for containing two first smart phones in an offset manner to facilitate the camera on both first smart phones to be functional, said assembly comprising:

a first case having a first camera opening extending through said first case wherein said first case is configured to contain a first smart phone having a camera on the first smart phone being aligned with said first camera opening, said first case having a rear wall and a perimeter wall extending away from said rear wall, said perimeter wall having a plurality of first access openings each extending through said perimeter wall wherein each of said first access openings is configured to facilitate respective elements on the first smart phone to be accessible when the first smart phone is in said first case, said perimeter wall having a top side, a bottom side, a first lateral side and a second lateral side, said first camera opening being positioned adjacent to said top side, said rear wall having a first surface and a second surface, said perimeter wall extending away from said first surface, said first camera opening extending through said first surface and said second surface; and a second ease having a second camera opening extending through said second case wherein said second case is configured to contain a second smart phone, said second case having a back wall and a perimeter wall extending away from said back wall, said perimeter wall of said second case having a plurality of second access openings each extending through said perimeter wall of said second case wherein each of said second access openings is configured to facilitate respective elements on the second smart phone to be accessible with the second smart phone is positioned in said second case, said perimeter wall of said second case having a top side, a bottom side, a first lateral side and a second lateral side, said back wall having a primary surface and a secondary surface, said perimeter wall of said second case extending away from said primary surface, said second camera opening extending through said primary surface and said secondary surface, each of said first lateral side and said second lateral side being associated with said first case being aligned with a respective one of said first lateral side and said second lateral side associated being with said second case, said second camera opening being positioned adjacent to said bottom side of said perimeter wall of said second case; and said secondary surface being bonded to said second surface of said back wall of said first case such that said first case and said second case are in a fixed offset position relative to each other wherein said first camera opening is exposed offset from said second case and said second camera opening is exposed offset from said first case.

* * * * *